US008115891B2

(12) United States Patent
Ota

(10) Patent No.: US 8,115,891 B2
(45) Date of Patent: Feb. 14, 2012

(54) LIQUID CRYSTAL DISPLAY DEVICE

(75) Inventor: Takayuki Ota, Oamishirasato (JP)

(73) Assignees: Hitachi Displays, Ltd., Chiba (JP); Panasonic Liquid Crystal Display Co., Ltd., Hyogo-ken (JP)

(*) Notice: Subject to any disclaimer, the term of this patent is extended or adjusted under 35 U.S.C. 154(b) by 196 days.

(21) Appl. No.: 12/416,215

(22) Filed: Apr. 1, 2009

(65) Prior Publication Data
US 2009/0251637 A1 Oct. 8, 2009

(30) Foreign Application Priority Data

Apr. 3, 2008 (JP) ................ 2008-097028

(51) Int. Cl.
G02F 1/1335 (2006.01)
G09F 13/04 (2006.01)
G09F 13/08 (2006.01)

(52) U.S. Cl. ........... 349/70; 349/64; 349/68; 362/97.1; 362/225

(58) Field of Classification Search .......... 349/64, 349/68, 70; 362/217.09, 613, 614, 603, 560, 362/561, 97.1–97.3, 225
See application file for complete search history.

(56) References Cited

U.S. PATENT DOCUMENTS

| 4,544,995 | A | * | 10/1985 | Suga | .................. | 362/225 |
| 6,024,468 | A | * | 2/2000 | Kassay et al. | ........... | 362/260 |
| 7,159,999 | B2 | * | 1/2007 | Yoo et al. | ........... | 362/249.01 |
| 7,661,862 | B2 | * | 2/2010 | Lee et al. | ........... | 362/559 |
| 2007/0121345 | A1 | * | 5/2007 | Chang et al. | ........... | 362/633 |
| 2008/0002098 | A1 | * | 1/2008 | Imajo et al. | ........... | 349/64 |
| 2009/0115783 | A1 | * | 5/2009 | Eichenlaub | ........... | 345/421 |

FOREIGN PATENT DOCUMENTS

JP 06-075216 3/1994
JP 2002-082626 3/2002
* cited by examiner

Primary Examiner — Mark Robinson
Assistant Examiner — Robert Tavlykaev
(74) Attorney, Agent, or Firm — Antonelli, Terry, Stout & Kraus, LLP.

(57) ABSTRACT

A liquid crystal display device includes a liquid crystal display panel and a backlight device which supplies light to a back surface of the liquid crystal display panel. The backlight device includes a diffusion plate, a plurality of cold cathode fluorescent lamps, and a reflection plate on which light is reflected. Assuming arrangement intervals of the plurality of cold cathode fluorescent lamps in the direction from a center portion to a peripheral portion as "a", "b", "c", "d", "e", and "f" respectively, the plurality of cold cathode fluorescent lamps is arranged to satisfy the relationship of $a > b \geq c \geq d \geq e \geq f$. Such a liquid crystal display device can control the brightness distribution due to the arrangement of the cold cathode fluorescent lamps within the backlight device thus obtaining a high-quality image display without generating brightness irregularities.

5 Claims, 5 Drawing Sheets

LIQUID CRYSTAL DISPLAY DEVICE

CROSS-REFERENCE TO RELATED APPLICATION

The present application claims priority from Japanese application JP2008-097028 filed on Apr. 3, 2008, the content of which is hereby incorporated by reference into this application.

BACKGROUND OF THE INVENTION

1. Field of the Invention

The present invention relates to a liquid crystal display device using a direct backlight device having cold cathode fluorescent lamps which is arranged on a back-surface side of a liquid crystal display panel and radiates light-source light to the liquid crystal display panel, and more particular to the arrangement structure of a plurality of cold cathode fluorescent lamps which is arranged in the inside of the backlight device.

2. Description of the Related Art

Recently, a liquid crystal display device has been popularly used as a display means for various information-terminal-use monitors including a personal computer, a mobile phone or a television receiver set or the like. In such a liquid crystal display device, an electronic image which is formed on a liquid crystal display panel is visualized by radiating light to the electronic image. With respect to miniaturized information equipment, there has been known information equipment which adopts the structure in which ambient light is utilized as a light source for visualization. However, to enable viewing of a favorable image on a relatively large-sized screen irrelevant to a condition of ambient light, many information equipment adopt the constitution in which an illumination light source is provided to a liquid crystal display panel, and an electronic image formed on the liquid crystal display panel is illuminated by illumination light radiated from the illumination light source.

With respect to the miniaturized liquid crystal display device, there has been known a liquid crystal display device which has the structure in which a so-called front-light device is arranged on a front surface of a liquid crystal display panel or in the vicinity of a periphery of the liquid crystal display panel as an illumination light source. However, with respect to a notebook-type personal computer, a computer monitor, a television receiver set or the like, an illumination light source which is arranged on a back-surface side of a liquid crystal display panel and is referred to as a backlight device has been adopted.

The backlight device is roughly classified into two kinds of backlight devices. One kind of backlight device is a side-edge-type backlight device which is used in a notebook-type personal computer or a computer monitor whose equipment size in the depth direction is limited, and another kind of backlight device is a direct backlight device which is used in a relatively-large-sized computer monitor or a television receiver set which is required to satisfy a demand for higher brightness and is arranged directly below a back surface of a liquid crystal display panel.

In these backlight devices, a cold cathode fluorescent lamp is mainly used as an illumination light source in many cases. The side-edge-type backlight device which uses the cold cathode fluorescent lamp is constituted by arranging the cold cathode fluorescent lamp on a side of a light guide body arranged on a back surface of the liquid crystal display panel and hence, the side-edge-type backlight device has an advantage that the backlight device can have the relatively compact constitution. However, the side-edge-type backlight device has a disadvantage that light utilization efficiency is low. On the other hand, the direct backlight device is constituted by arranging a plurality of cold cathode fluorescent lamps parallel to each other on a back surface of a liquid crystal display panel without arranging a light guide body and hence, the direct backlight device has an advantage that the direct backlight device can acquire high light utilization efficiency. However, the direct backlight has a disadvantage that a thickness of the backlight device per se becomes large.

For example, JP-A-2002-82626 (Patent document 1) discloses a backlight device which is constituted of a plurality of straight-tube-type fluorescent lamps as a light source, a light diffusion plate which is arranged on a liquid-crystal-display-panel side of the respective cold cathode fluorescent lamps, a polarization conversion film, a prism sheet, and a reflection plate which is arranged on a back-surface side of the respective cold cathode fluorescent lamps. Further, for example, JP-A-6-75216 (Patent document 2) discloses a liquid crystal display device which is configured such that such a backlight device is arranged on a back-surface side of a liquid crystal display panel and light-source light of the backlight device is radiated to a back surface of the liquid crystal display panel.

SUMMARY OF THE INVENTION

A liquid crystal display device according to the present invention includes: a liquid crystal display panel in which a liquid crystal layer is sandwiched between a first light-transmitting substrate having pixel electrodes and a second light-transmitting substrate having color filters, a first polarizer is formed on a back surface of the first light-transmitting substrate, and a second polarizer is mounted on a front surface of the second light-transmitting substrate; and a backlight device which is arranged on a back-surface side of the liquid crystal display panel and supplies a light to the liquid crystal display panel. The backlight device includes: a diffusion plate which includes a light radiation surface for radiating diffusion light to the back surface of the liquid crystal display panel; a plurality of cold cathode fluorescent lamps which is arranged parallel to each other in a state that the cold cathode fluorescent lamps face a back surface of the diffusion plate in an opposed manner and radiates a light-source light to the diffusion plate, and a reflection plate which is arranged to face back surfaces of the plurality of cold cathode fluorescent lamps and reflects the light-source light radiated from the plurality of cold cathode fluorescent lamps to the diffusion plate. The plurality of cold cathode fluorescent lamps are arranged such that arrangement intervals of the plurality of cold cathode fluorescent lamps at a center portion thereof corresponding to a center portion of a display screen of the liquid crystal display panel are set larger than the arrangement intervals of the plurality of cold cathode fluorescent lamps at peripheral portions thereof corresponding to peripheral portions of the display screen of the liquid crystal display panel. Due to such constitution, the brightness distribution within an effective display area of the liquid crystal display panel is enhanced and hence, a surface-light-source light which exhibits highly brightness uniformity is radiated to the back surface of the liquid crystal display panel.

DESCRIPTION OF THE PREFERRED EMBODIMENTS

Figure 1:
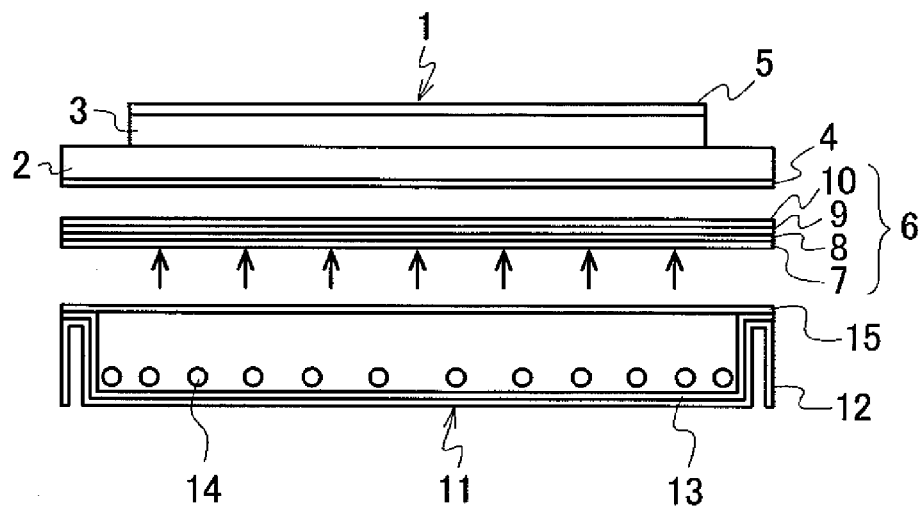
FIG. 1 is a cross-sectional view of an essential part of the constitution of a liquid crystal display device according to one embodiment of the present invention.

A backlight device which is applied to a conventional liquid crystal display device can enhance the brightness by increasing the number of cold cathode fluorescent lamps. However, the conventional liquid crystal display device has drawbacks that the power consumption of the backlight device is increased and a temperature of the backlight device is elevated.

Further, when arrangement intervals of the cold cathode fluorescent lamps arranged at a center portion of a display screen of the liquid crystal display panel are set small without increasing the number of the cold cathode fluorescent lamps, arrangement intervals of the cold cathode fluorescent lamps at peripheral portions of the display screen become relatively large thus giving rise to a drawback that the brightness at the peripheral portions is lowered whereby the brightness uniformity of a display screen is lowered.

It may be possible to overcome this drawback relating to the uniformity of brightness to some extent with the use of a reflection plate which is formed of an optical sheet and a highly reflective member. However, there arises a new drawback that a material cost is pushed up.

The present invention has been made to overcome the above-mentioned drawbacks of the prior art, and it is an object of the present invention to provide a liquid crystal display device which can acquire a high-quality image display which causes no brightness irregularities on a display screen of a liquid crystal display panel by making use of a direct backlight device having cold cathode fluorescent lamps which can enhance the brightness at a center portion of the display screen, can decrease the lowering of brightness at a peripheral portion of the display screen, and can enhance the uniformity of brightness of the display screen.

To achieve the above-mentioned objects, the liquid crystal display device according to the present invention has the following constitutions.

(1) The liquid crystal display device of the present invention includes a liquid crystal display panel and a backlight device. The liquid crystal display panel is configured such that a liquid crystal layer is sandwiched between a first light-transmitting substrate having pixel electrodes and a second light-transmitting substrate having color filters, a first polarizer is formed on a back surface of the first light-transmitting substrate, and a second polarizer is mounted on a front surface of the second light-transmitting substrate. The backlight device is arranged on a back-surface side of the liquid crystal display panel and supplies light to the liquid crystal display panel. Further, the backlight device is constituted of a diffusion plate which includes a light radiation surface for radiating diffusion light to the back surface of the liquid crystal display panel, a plurality of cold cathode fluorescent lamps which is arranged parallel to each other in a state that cold cathode fluorescent lamps face a back surface of the diffusion plate in an opposed manner and radiates a light-source light to the diffusion plate, and a reflection plate which is arranged to face back surfaces of the plurality of cold cathode fluorescent lamps and reflects the light-source light radiated from the plurality of cold cathode fluorescent lamps to the diffusion plate. Arrangement intervals of the plurality of cold cathode fluorescent lamps at a center portion corresponding to a center portion of a display screen of the liquid crystal display panel are set larger than the arrangement intervals of the plurality of cold cathode fluorescent lamps at peripheral portions corresponding to peripheral portions of the display screen of the liquid crystal display panel. Due to such constitution, brightness distribution within an effective display area of the liquid crystal display panel is enhanced, a surface-light-source light having high brightness uniformity is radiated to a back surface of the liquid crystal display panel and hence, and the liquid crystal display device of the present invention can overcome the above-mentioned drawbacks.

(2) According to another liquid crystal display device of the present invention, in the above-mentioned constitution (1), the plurality of cold cathode fluorescent lamps are arranged such that the arrangement intervals of the plurality of cold cathode fluorescent lamps are preferably set equal or are gradually narrowed in the direction from the center portion to the peripheral portions.

(3) According to still another liquid crystal display device of the present invention, in the above-mentioned constitution (1) or (2), assuming the arrangement intervals of the plurality of cold cathode fluorescent lamps in the direction from the center portion to the peripheral portion as "a", "b", "c", "d", "e", and "f" respectively, the plurality of cold cathode fluorescent lamps may preferably be arranged to satisfy the relationship of a>b≧c≧d≧e≧f.

(4) According to a further liquid crystal display device of the present invention, in any one of the above-mentioned constitutions (1) to (3), the plurality of cold cathode fluorescent lamps may preferably be formed of an internal-electrode-type cold cathode fluorescent lamps or an external-electrode-type cold cathode fluorescent lamp.

Here, the present invention is not limited to the above-mentioned constitutions, and various modifications are conceivable without departing from the technical concept of the present invention.

According to the present invention, with respect to the plurality of cold cathode fluorescent lamps arranged in the inside of the backlight device arranged on the back surface side of the liquid crystal display panel, the arrangement intervals of the plurality of cold cathode fluorescent lamps at the center portion corresponding to the center portion of the display screen of the liquid crystal display panel are set larger than the arrangement intervals of the plurality of cold cathode fluorescent lamps at the peripheral portions corresponding to the peripheral portions of the display screen of the liquid crystal display panel. Accordingly, without increasing the number of cold cathode fluorescent lamps, the power consumption, the elevation of temperature and the like, the lowering of brightness at the peripheral portions of the display screen can be decreased, and the brightness distribution within the effective display area can be enhanced and hence, a surface-light-source light having high brightness uniformity is radiated to the back surface of the liquid crystal display panel whereby the liquid crystal display device can acquire extremely excellent advantageous effects such as the realization of a high-quality image display with no brightness irregularities.

Hereinafter, specific embodiments of the liquid crystal display device according to the present invention are explained in detail in conjunction with drawings showing the embodiments.

Embodiment 1

FIG. 1 is a longitudinal cross-sectional view of an essential part of the constitution of a liquid crystal display device according to one embodiment of the present invention. In FIG. 1, the liquid crystal display panel 1 is constituted of a first glass substrate 2 which is formed of a light-transmitting glass plate, a second glass substrate 3 which is formed of a light-transmitting glass plate, a liquid crystal layer which is sandwiched between the first and second glass substrates 2, 3, and electrodes or active elements and the like for forming pixels which are formed on both or one of inner surfaces of the first glass substrate 2 and the second glass substrate 3. Here, the first glass substrate 2 on which active elements such as thin film transistors (TFTs) are formed is referred to as an active-matrix substrate, a glass substrate which uses thin film transistors is also referred to as a TFT substrate, and the second glass substrate 3 on which color filters are formed is referred to as a filter substrate.

Further, a first polarizer 4 is stacked on a main surface of the first glass substrate 2 (backlight-device side) by adhesion or the like, and a second polarizer 5 is stacked on a main surface of the second glass substrate 3 (display-surface side) by adhesion or the like. Further, on a back-surface side of the liquid crystal display panel 1, an optical compensation sheet 6 is arranged. The optical compensation sheet 6 is constituted by stacking a first diffusion sheet 7, a first prism sheet 8, a second prism sheet 9 and a second diffusion sheet 10 by adhesion or the like in this order from a side which faces a diffusion plate of a backlight device described later. Further, a direct backlight device 11 is arranged on a back-surface side of the optical diffusion sheet 6.

Figure 2:
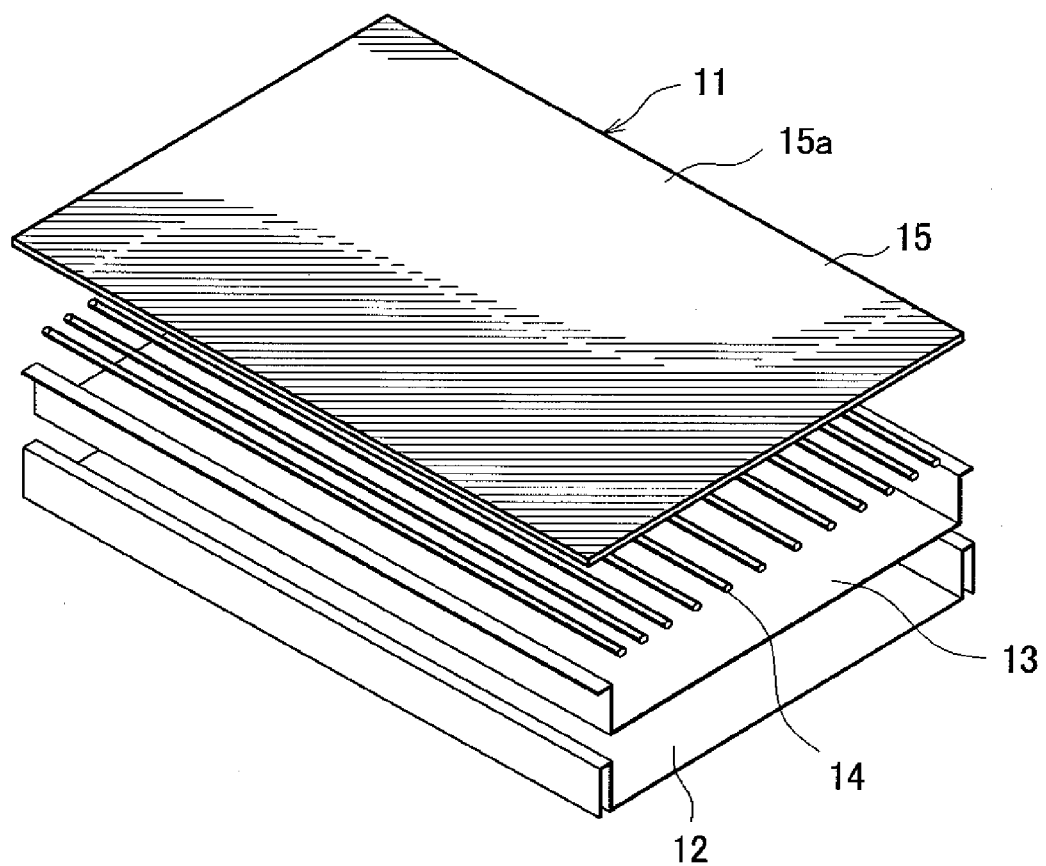
FIG. 2 is a developed view of an essential part of the constitution of a direct backlight device of the liquid crystal display device shown in FIG. 1.
Figure 3:
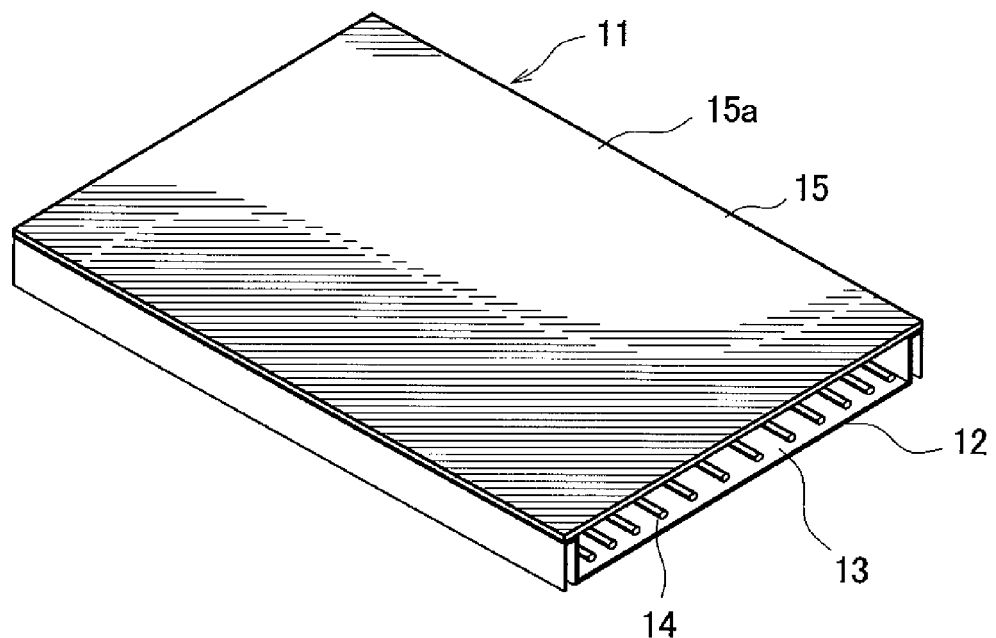
FIG. 3 is a perspective view showing an essential part of the constitution of the backlight device shown in FIG. 2 after assembling.

FIG. 2 and FIG. 3 are views for explaining the constitution of the direct backlight device which is arranged on a back-surface side of the liquid crystal display panel 1 shown in FIG. 1, wherein FIG. 2 is a developed view of an essential part of the liquid crystal display panel, and FIG. 3 is a perspective view of an essential part of the liquid crystal display panel after assembling. As shown in these drawings, the backlight device 11 is configured as follows. In the inside of a frame 12 which is, for example, formed of a molded body made of a resin material or a metal material, a reflection plate 13 is housed. The reflection plate 13 has an inner wall surface thereof mirror-finished and is formed of a molded body of an acrylic or a polycarbonate white resin material, for example. In the inside of the reflection plate 13, a plurality of cold cathode fluorescent lamps 14 is arranged parallel to each other at unequal intervals (at arbitrary arrangement intervals) described later. Further, at an upper opening end of the reflection plate 13, a diffusion plate 15 which includes a light radiation surface 15a for diffusing light-source light to the back-surface side of the liquid crystal display panel 1 is arranged in a state that the diffusion plate 15 faces an arrangement surface of the plurality of cold cathode fluorescent lamps 14.

Figure 4:
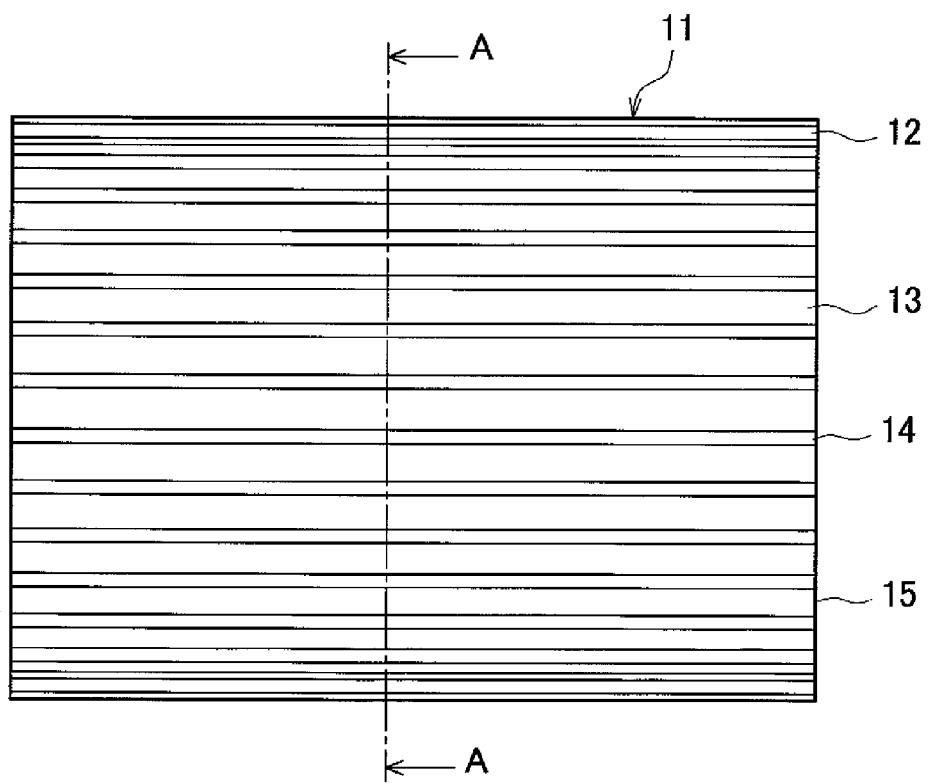
FIG. 4 is a top plan view of an essential part of the arrangement structure of a plurality of cold cathode fluorescent lamps which is arranged in the inside of the backlight device shown in FIG. 2.
Figure 5:
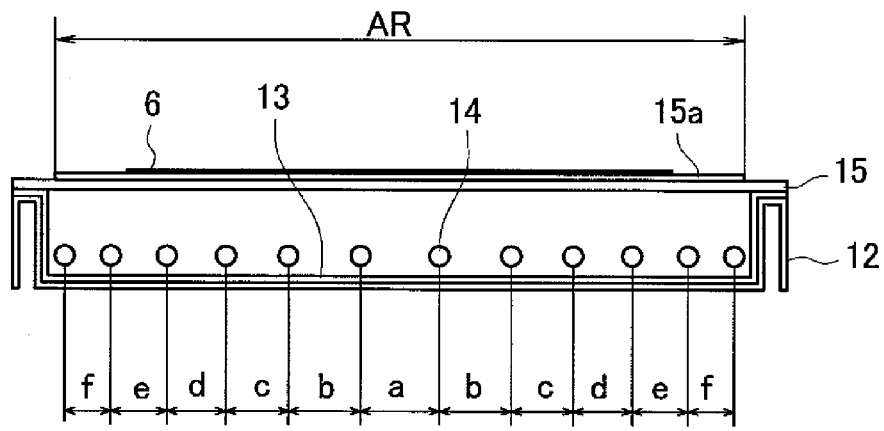
FIG. 5 is a cross-sectional view of an essential part taken along a line A-A in FIG. 4.

FIG. 4 and FIG. 5 are views for explaining the arrangement structure of the plurality of cold cathode fluorescent lamps which is arranged in the inside of the backlight device 11, wherein FIG. 4 is a plan view of an essential part of the backlight device as viewed from above, and FIG. 5 is a cross-sectional view of an essential part taken along a line A-A in FIG. 4. Here, in these drawings, parts identical with the parts shown in the above-mentioned drawings are given same numerals, and their repeated explanation is omitted. In these drawings, the plurality of cold cathode fluorescent lamps 14 which is arranged parallel to each other in the inside of the backlight device 11 at unequal intervals is arranged such that an arrangement intervals of the of the cold cathode fluorescent lamps 14 are set equal or are gradually narrowed in the direction from a center portion thereof corresponding to the center portion of the display screen to peripheral portions thereof within an effective display area AR of the liquid crystal display panel 1 shown in FIG. 1.

That is, as shown in FIG. 5, within the effective display area AR, assuming the arrangement intervals of the cold cathode fluorescent lamps 14 in the direction from the center portion thereof corresponding to the center portion of the display screen to the peripheral portions thereof corresponding to peripheral portions of the display screen as "a", "b", "c", "d", "e", and "f" respectively, the cold cathode fluorescent lamps 14 are arranged to satisfy the relationship of a>b≧c≧d≧e≧f. Here, the arrangement interval "a" at the center portion is an arrangement interval of the cold cathode fluorescent lamps 14 by which a targeted screen-center-portion brightness can be obtained.

Figure 6:
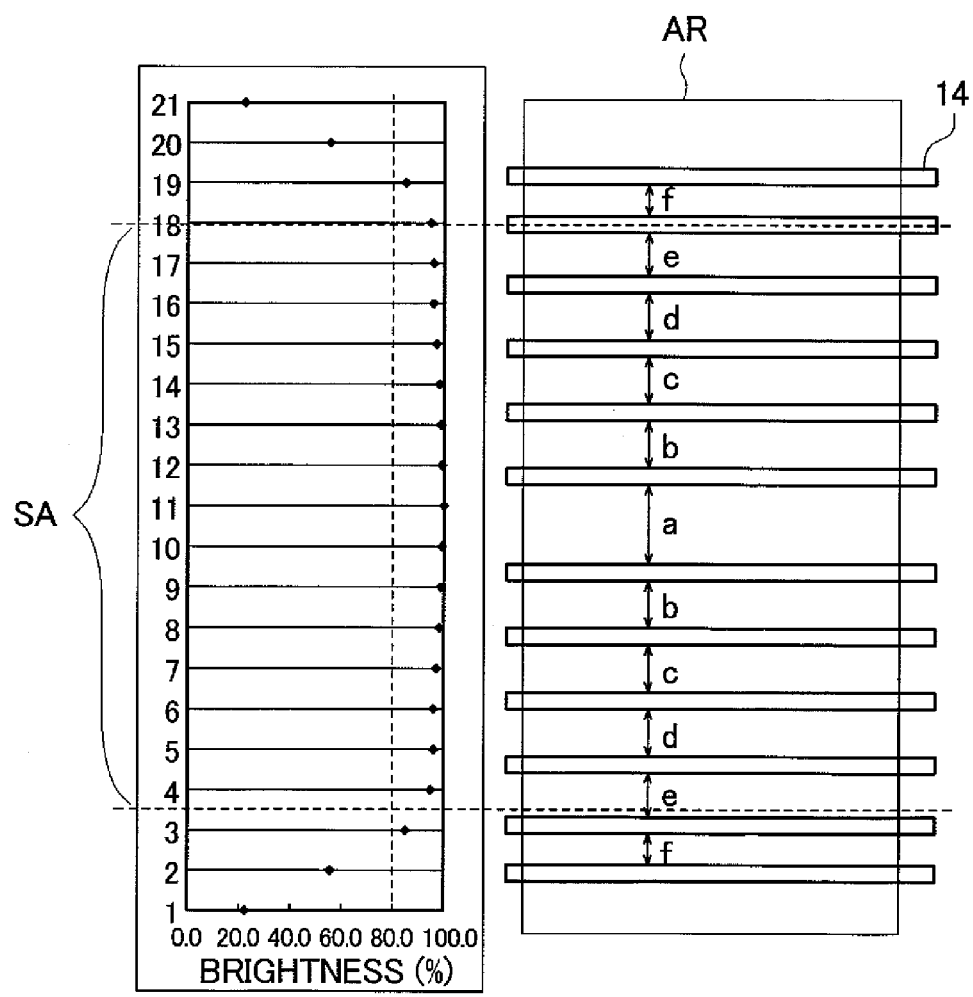
FIG. 6 is a view showing the relationship of brightness distribution in the arrangement structure in which the plurality of cold cathode fluorescent lamps is arranged at unequal intervals within an effective display area of the liquid crystal display panel.
Figure 7:
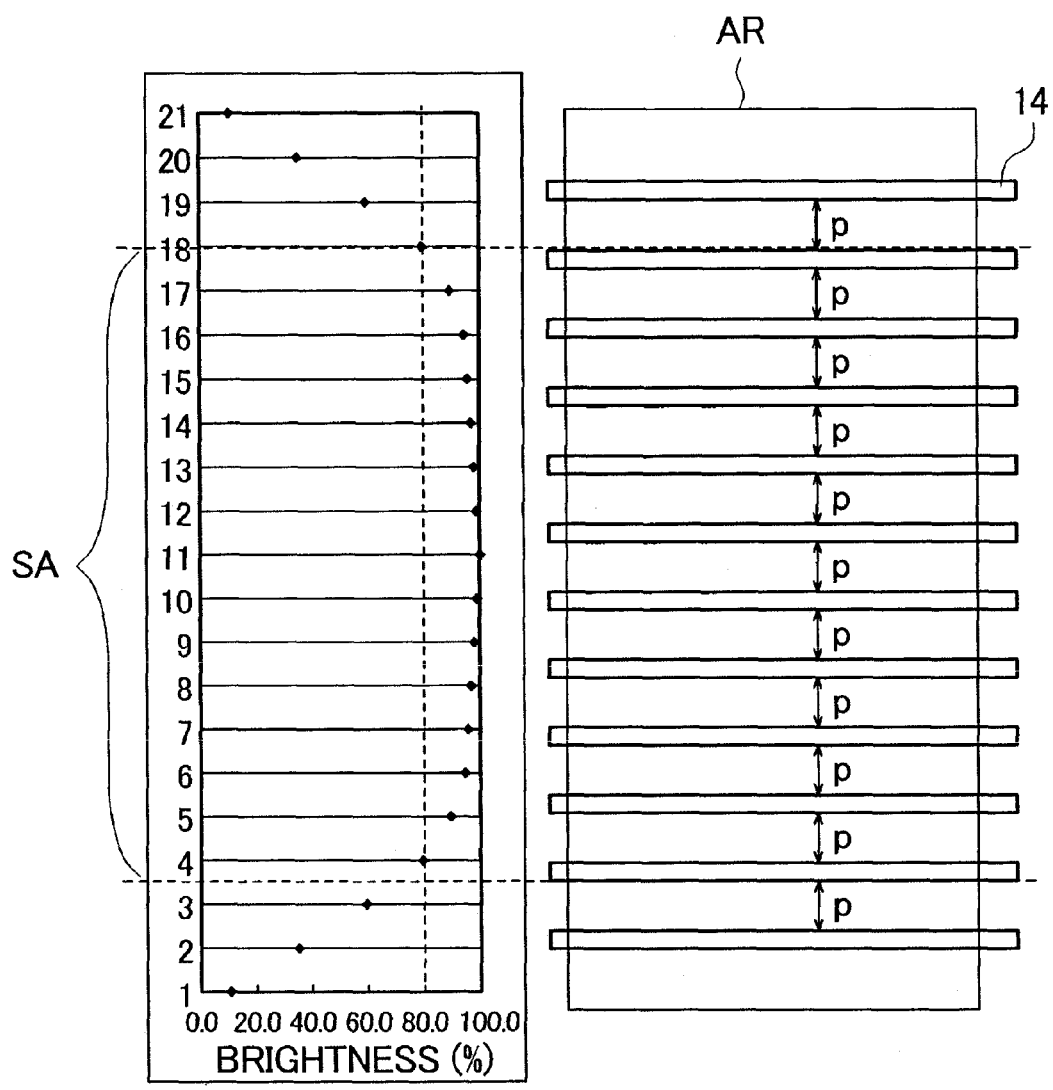
FIG. 7 is a view showing the relationship of brightness distribution in the existing arrangement structure in which a plurality of cold cathode fluorescent lamps is arranged at equal intervals within an effective display area of a liquid crystal display panel for a comparison purpose.

FIG. 6 is a view showing the relationship of brightness distribution of the arrangement structure in which the plurality of cold cathode fluorescent lamps 14 is arranged at unequal intervals within the effective display area AR of the liquid crystal display panel 1 shown in FIG. 1. Further, FIG. 7 is a view showing the relationship of brightness distribution of the existing arrangement structure in which the plurality of cold cathode fluorescent lamps 14 is arranged at equal intervals "p" within the effective display area AR for a comparison purpose. Here, these distributions are measured values on a light radiation surface 15a of the diffusion plate 15 shown in FIG. 1. In FIG. 6 and FIG. 7, numerical values 1 to 21 on a left side of the drawings indicate points of measurement.

As shown in FIG. 6, the present invention adopts the arrangement structure in which the plurality of cold cathode fluorescent lamps 14 is arranged within the effective display area AR of the liquid crystal display panel in a state that the arrangement intervals of the cold cathode fluorescent lamps 14 satisfy the relationship of a>b≧c≧d≧e≧f in the direction from the center portion of the plurality of cold cathode fluorescent lamps 14 to the peripheral portions of the plurality of cold cathode fluorescent lamps 14. Due to such constitution, while keeping a total luminous flux radiated from the plurality of cold cathode fluorescent lamps 14 unchanged, by reducing an amount of luminous flux at the center portion due to the arrangement of the cold cathode fluorescent lamps 14, it is possible to utilize such a reduced amount of luminous flux at the peripheral portions. Accordingly, it is possible to largely reduce the brightness difference between the maximum brightness and the minimum brightness in a standard area SA within the effective display area AR of the liquid crystal display panel 1.

To the contrary, with respect to the existing arrangement structure exemplified as a comparison example shown in FIG. 7 in which the plurality of cold cathode fluorescent lamps 14 is arranged at equal intervals "p" in the direction from the center portion to the peripheral portions, although the maximum brightness can be obtained at the center portion in the standard area SA, the brightness distribution is gradually lowered in the direction from the center portion to the peripheral portions and hence, the brightness difference between the maximum brightness and the minimum brightness is gradually increased.

Accordingly, it is evident that the arrangement structure according to the embodiment explained in conjunction with FIG. 6 in which the plurality of cold cathode fluorescent lamps 14 is arranged parallel to each other at unequal intervals in the direction from the center portion to the peripheral portions can largely enhance the brightness distribution within the effective display area AR thus acquiring brightness uniformity.

Here, it may be considered that by setting the arrangement interval "a" at the center portion of the plurality of cold cathode fluorescent lamps 14 shown in FIG. 6 larger than other arrangement intervals "b", "c", "d", "e", and "f", the brightness distribution characteristic at the center portion is slightly lowered. However, it is found that no problem arises in practical use of the liquid crystal display device because such lowering is compensated by an amount of luminous flux generated by the plurality of other arranged cold cathode fluorescent lamps 14.

Further, in FIG. 6 and FIG. 7, arrangement positions of the cold cathode fluorescent lamps 14 which are respectively arranged at upper and lower ends of the effective display area AR are not changed, and the cold cathode fluorescent lamps 14 are fixed at predetermined positions. Further, a fixed tube current flows into all of the plurality of cold cathode fluorescent lamps 14, and the measurement of brightness distribution and the comparison of brightness distributions are performed by simultaneously turning on the plurality of cold cathode fluorescent lamps 14.

The backlight device having such constitution can, without increasing the number of cold cathode fluorescent lamps 14 in the inside of the backlight device 11, the power consumption, the temperature elevation and the like, decrease the lowering of brightness at the peripheral portions of the liquid crystal display panel 1 and hence, the brightness distribution within the effective display area AR can be enhanced whereby it is possible to radiate a surface-light-source light having high brightness uniformity to the back surface of the liquid crystal display panel 1.

Figure 8:
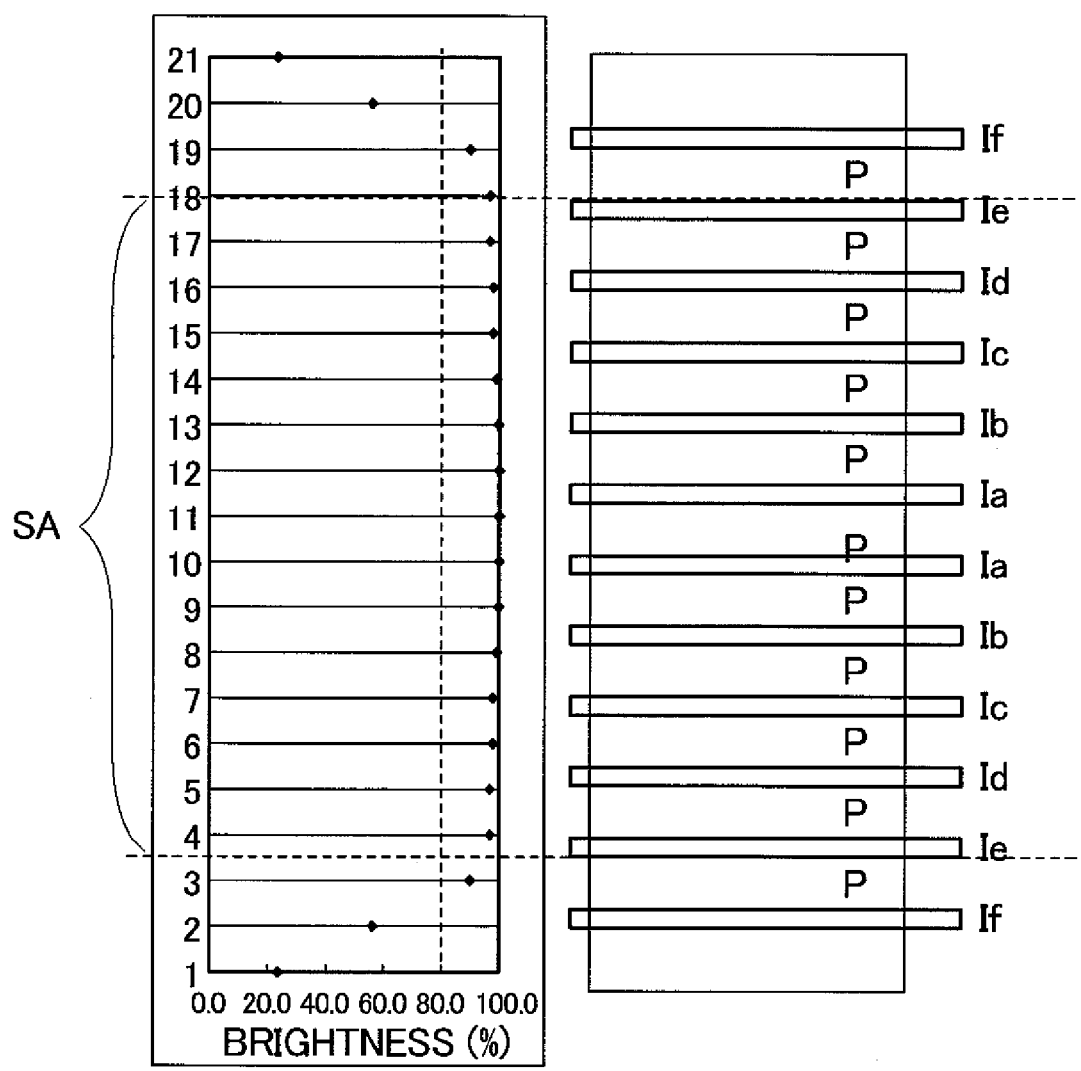
FIG. 8 is a view showing the relationship of brightness distribution in the constitution of a backlight device according to another embodiment of the present invention.

FIG. 8 is a view showing the relationship of brightness distribution obtained by the constitution of a backlight device according to another embodiment of the present invention. In this embodiment, a plurality of cold cathode fluorescent lamps is arranged at equal intervals within an effective display area AR of a liquid crystal display panel 1. The cold cathode fluorescent lamps which are arranged adjacent to each other are arranged at an interval "p". Further, with respect to tube currents which flow into the cold cathode fluorescent lamps, the tube current which flows into the cold cathode fluorescent lamp arranged at a center portion of a screen takes the smallest value, and the tube current which flows into the cold cathode fluorescent lamps arranged at peripheral portions of the screen takes the largest value. That is, assuming the tube currents which flow in the respective cold cathode fluorescent lamps arranged in order from the cold cathode fluorescent lamp arranged at the center potion to the cold cathode fluorescent lamps arranged at the peripheral portions as "Ia", "Ib", "Ic", "Id", "Ie" and "If", the relationship of Ia<Ib≦Ic≦Id≦Ie≦If is established. By reducing an amount of luminous flux at the center portion of the screen by decreasing an amount of the tube current which flows into the cold cathode fluorescent lamp arranged at the center portion of the screen, it is possible to adjust the brightness difference between the center portion of the screen and the peripheral portions of the screen. Due to such constitution, it is possible to largely reduce the brightness difference between the maximum brightness and the minimum brightness in a standard area SA within an effective display area AR of the liquid crystal display panel 1.

Further, in changing a tube current between the cold cathode fluorescent lamp arranged at the center portion of the screen and the cold cathode fluorescent lamp arranged at the peripheral portion of the screen, it is possible to separately control the tube current between the cold cathode fluorescent lamps arranged in an upper-half region of the screen and the cold cathode fluorescent lamps arranged in a lower-half region of the screen. That is, in the upper-half region of the screen, assuming tube currents as "Iau", "Ibu", "Icu", "Idu", "Ieu" and "Ifu" respectively in the direction from the center portion of the screen to the upper portion of the screen, the relationship of Iau<Ibu≦Icu≦Idu≦Ieu≦Ifu is established. On the other hand, in the lower-half region of the screen, assuming tube currents as "Iad", "Ibd", "Icd", "Idd", "Ied" and "Ifd" respectively in the direction from the center portion of the screen to the upper portion of the screen, the relationship of Iad<Ibd≦Icd≦Idd≦Ied≦Ifd is established. By performing different controls between the upper side and the lower side of the screen, it is possible to realize the control of brightness which takes the temperature elevation into consideration.

Further, with respect to the liquid crystal display device which arranges the backlight device 11 having such constitution on a back-surface side of the liquid crystal display panel 1, a surface-light-source light having a high numerical aperture and high brightness uniformity is radiated to the back surface of the liquid crystal display panel 1 from the backlight device 11 and hence, the liquid crystal display device can obtain a high quality image in which no brightness irregularities are generated between the center portion and the peripheral portions of the display screen of the liquid crystal display panel 1.

Here, in the above-mentioned embodiments, the explanation has been made with respect to the constitution in which, assuming the arrangement intervals of the plurality of cold cathode fluorescent lamps 14 in the direction from the center portion to the peripheral portion as "a", "b", "c", "d", "e" and "f", the cold cathode fluorescent lamps 14 are arranged so as to satisfy the relationship of a>b≧c≧d≧e≧f. However, the present invention is not limited to the above-mentioned constitution. As still another embodiment, the plurality of cold cathode fluorescent lamps 14 may adopt the following arrangement constitution which divides the effective display area AR shown in FIG. 6 into nine sections in plane so as to provide the arrangement intervals of cold cathode fluorescent lamps 14 separate from each other. That is, by taking influence exerted by temperature characteristic depending on use conditions including a manner of installation of the liquid crystal display device or the like into consideration, the inside of the effective display area AR shown in FIG. 6 is vertically divided into an upper portion and a lower portion using an interval "a" at a center portion as a boundary, the arrangement intervals of the cold cathode fluorescent lamps are set so as to satisfy the relationship of $b_1 \geq c_1 \geq d_1 \geq e_1 \geq f_1$ in the upper portion, and the arrangement intervals of the cold cathode fluorescent lamps are set so as to satisfy the relationship of $b_2 \geq c_2 \geq d_2 \geq e_2 \geq f_2$ in the lower portion. Due to such constitution, the liquid crystal display device having such arrangement constitution can also acquire advantageous effects substantially equal to the advantageous effects of the above-mentioned embodiments.

Further, in the above-mentioned embodiments, the plurality of cold cathode fluorescent lamps which constitutes the cold-cathode-fluorescent-lamp direct backlight device is not particularly limited with respect to a type of electrodes thereof. It is needless to say that the liquid crystal display device of the present invention can acquire advantageous effects substantially equal to the advantageous effects of the above-mentioned embodiments with the use of either one of an internal-electrode-type cold cathode fluorescent lamp and an external-electrode-type cold cathode fluorescent lamp.

In the above-mentioned embodiments, the explanation has been made with respect to the liquid crystal display device which mounts the cold-cathode-fluorescent-lamp direct backlight device on the back-surface side of the liquid crystal display panel. However, even when the present invention is applied to a display device which adopts the backlight device having the above-mentioned constitution such as a liquid crystal television receiver set, a large-sized liquid crystal monitor, a vehicle-mounted liquid crystal display (liquid-crystal car navigation), a mobile-phone-use display, a gaming-machine-use liquid crystal display, a medical-use liquid crystal monitor, a printing/designing-use liquid crystal monitor or the like, the display device can acquire advantageous effects substantially equal to the above-mentioned advantageous effects.

What is claimed is:

1. A liquid crystal display device comprising:
a liquid crystal display panel in which a liquid crystal layer is sandwiched between a first light-transmitting substrate having pixel electrodes and a second light-transmitting substrate having color filters, a first polarizer is formed on a back surface of the first light-transmitting substrate, and a second polarizer is mounted on a front surface of the second light-transmitting substrate;
a backlight device which is arranged on a back-surface side of the liquid crystal display panel and supplies a light to the liquid crystal display panel, wherein
the backlight device includes:
a diffusion plate which includes a light radiation surface for radiating diffusion light to the back surface of the liquid crystal display panel;
a plurality of cold cathode fluorescent lamps which is arranged parallel to each other in a state that the cold cathode fluorescent lamps face a back surface of the diffusion plate in an opposed manner and radiates a light-source light to the diffusion plate, and
a reflection plate which is arranged to face back surfaces of the plurality of cold cathode fluorescent lamps and reflects the light-source light radiated from the plurality of cold cathode fluorescent lamps to the diffusion plate, and
the plurality of cold cathode fluorescent lamps are arranged symmetrically with respect to a center portion of the arrangement such that an arrangement interval between one of adjacent pairs of the plurality of cold cathode fluorescent lamps at the center portion thereof corresponding to a center portion of a display screen of the liquid crystal display panel is set larger than the arrangement intervals between others of the adjacent pairs of the plurality of cold cathode fluorescent lamps arranged at positions spaced from the central portion in a direction toward peripheral portions thereof corresponding to peripheral portions of the display screen of the liquid crystal display panel.

2. A liquid crystal display device according to claim 1, wherein the plurality of cold cathode fluorescent lamps are arranged such that the arrangement intervals of the others of the adjacent pairs of the plurality of cold cathode fluorescent lamps are set equal or are gradually narrowed in the direction from the center portion to the peripheral portions.

3. A liquid crystal display device according to claim 1, wherein assuming the arrangement interval of the one of the adjacent pairs of the plurality of cold cathode fluorescent lamps as "a", and the arrangement intervals of the others of the adjacent pairs of the plurality of cold cathode fluorescent lamps in the direction spaced from the center portion to one of the peripheral portions as "b", "c", "d", "e", and "f" respectively, the plurality of cold cathode fluorescent lamps is arranged to satisfy the relationship of $a > b \geq c \geq d \geq e \geq f$.

4. A liquid crystal display device according to claim 1, wherein the plurality of cold cathode fluorescent lamps is formed of internal-electrode-type cold cathode fluorescent lamps.

5. A liquid crystal display device according to claim 1, wherein the plurality of cold cathode fluorescent lamps is formed of external-electrode-type cold cathode fluorescent lamps.

* * * * *